Patented June 8, 1954

2,680,748

UNITED STATES PATENT OFFICE 2,680,748

BETA CONIDENDROL AND PROCESS FOR MAKING THE SAME

Holger Gustaf Henrik Erdtman, Stockholm, Sweden, assignor to Crown Zellerbach Corporation, Camas, Wash., a corporation of Nevada No Drawing. Application September 26, 1950, Serial No. 186,906

22 Claims. (Cl. 260—343.3)

This invention relates to beta conidendrol, also known as beta norconidendrin, and to a process for making the same.

Beta conidendrol is a stereoisomer of conidendrol, or 1,2,3,4-tetrahydro-6,7-dihydroxy-4-(3,4'-dihydroxyphenyl) - 3 - (hydroxymethyl) -2-naphthoic acid-gamma-lactone. It is a derivative of conidendrin, or alpha 1,2,3,4-tetrahydro-6-hydroxy - 7 - methoxy - 4 -(3'- methoxy - 4'-hydroxyphenyl) - 3 -(hydroxymethyl) -2-naphthoic acid-gamma-lactone, a wood extractive substance present in the sulfite waste liquor obtained during the pulping of western hemlock and other trees and isolated from the liquor by treatment with suitable organic liquids. It is a phenolic compound useful as an antioxidant for edible oils, for petroleum lubricating oils, and for paraffin waxes, and as a nonstaining antioxidant for rubber. It also is useful as a bacteriostat against various microorganisms. Because of the several reactive functional groups present, it is a valuable starting material for the synthesis of pharmaceuticals, dyes, and other organic compounds.

The structures of conidendrin and of conidendrol are indicated by the general formula given below, the formula being that of conidendrin when R is a methyl group (CH$_3$), and that of conidendrol when R is hydrogen (H).

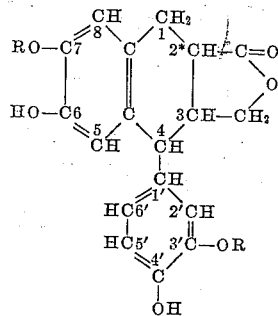

Both conidendrin and conidendrol occur as diastereoisomers, a fact which may be attributable to an inversion occurring at the carbon atom adjacent the carbonyl group of the lactone ring, marked with an asterisk in the formula. Thus conidendrin in the form in which it normally is isolated, i. e. alpha conidendrin, may be converted by appropriate treatment to a diastereoisomer termed beta conidendrin (Holmberg, Ber. 54, 2389 (1921)). Conidendrol also exists in the form of two geometric isomers, the one being termed alpha conidendrol since it has the same basic configuration as the normal conidendrin, and the other, to which the present invention relates, being termed beta conidendrol because of its correspondence in geometric structure to beta conidendrin.

As is apparent from a consideration of the general formula given above, conidendrol differs structurally from conidendrin in that the methoxyl groups present in the latter have been converted to phenolic groups. The demethylation reaction required to effect this conversion is difficult to consummate, however, because of the great sensitivity of conidendrin to various chemical reagents. Being a phenol, it is very easily halogenated as by means of the free halogen which may be present in the reagents used for the demethylation. Being a reducing agent, it is sensitive to an oxidizing environment. Furthermore, since it contains phenolic groups and a lactone ring, both of which are very reactive chemically, side reactions may occur during the demethylation to produce tars and other unwanted by-products. The problem is further complicated by the fact that reasonably strenuous conditions of reaction are required to effect the demethylation, this favoring the occurrence of the side reactions.

I now have discovered that, by reacting conidendrin with salts of organic bases, e. g. the amine hydrochlorides, not only is the conidendrin smoothly demethylated to form a conidendrol product, but also an inversion occurs so that the conidendrol product is beta conidendrol rather than the expected alpha conidendrol. Hence by a single reaction, I am able to produce directly from conidendrin beta conidendrol in the pure state and in yields approaching the theoretical. This desirable result is obtained furthermore by means of a relatively simple reaction requiring only readily available and inexpensive reagents.

The organic bases, the salts of which may be used for the purposes of the present invention, include primary, secondary as well as tertiary amines. Illustrative of primary amines which may be used are methyl amine, ethyl amine, and propyl amine. Representative of suitable secondary amines are dimethyl amine, diethyl amine, dipropyl amine, methyl ethyl amine, and methyl propyl amine. Typical of the tertiary amines which may be employed are trimethyl amine, tri-ethyl amine, dimethyl ethyl amine, and the like. Particularly well suited are the cyclic tertiary amines including pyridine, the picolines, the butidines, quinoline, and the alkyl substituted quinolines such as methyl quinoline. Salts of the foregoing and other organic bases which may be used in carrying out the presently described process include the sulfates, the acetates, the chloroacetates, the phosphates, and, particularly, the hydrochlorides. These various salts of the above and other organic bases may be used singly or in combination with each other.

In effectuating the presently described process, the conidendrin first is mixed with at least about two mols of organic base salt for each mol of conidendrin, this being the stoichiometric quantity. Quantities larger than this may be employed, however, the excess salt serving as a solvent for the reactants. The reaction mixture then is heated to a temperature sufficient to melt the amine hydrochloride and to effect the desired demethylation and inversion. This temperature, obviously, is dependent upon the particular salt employed and hence is termed herein "a conidendrin demethylating and inverting" temperature. With most salts, temperatures falling within the range of between about 150° C. and about 250° C. are appropriate.

The reactants are heated together with or without stirring or other form of agitation until the demethylation and inversion are complete. With the more reactive organic base salts, this may require as little as one-half hour or even less. The reaction mixture then may be processed in any suitable manner to recover the beta conidendrol therefrom. It may, for example, be poured while molten into a quantity of water which may contain, if desired, a quantity of sodium bisulfite to prevent oxidation of the product, and a small proportion of decolorizing charcoal. The resulting mixture then may be filtered while hot and extracted with a suitable solvent for beta conidendrol, e. g. diethyl ether. The solvent then may be removed by evaporation, leaving the beta conidendrol as a solid residue. The latter then may be recrystallized from hot water, for example, to obtain the product in pure form.

The process of the invention is further illustrated in the following examples:

*Example 1*

This example illustrates the application of a salt of a cyclic tertiary amine, pyridine, to the process of the present invention.

A mixture of 5.2 g. of conidendrin and 11 g. of pyridine hydrochloride was heated for two hours at 180° C. The melt thus obtained was dissolved in 80 ml. of 2 N hydrochloric acid. The solution was extracted with ether. The ether was driven off, and the residue was recrystallized from boiling water. 4.1 g. of crystalline beta conidendrol having a melting point of 245–246° C. were obtained. The yield was 85% of the theoretical, and the product was characterized as follows:

$$\alpha_D^{20} + 13° \text{ (acetone, C=2)}$$

Analysis: $C_{18}H_{16}O_6$

Calculated: C, 65.8; H, 4.92
Found: C, 65.7; H, 4.92

The beta conidendrol obtained as described above was further characterized by preparing a suspension of 4 g. of the conidendrol in 20 ml. of acetic anhydride. 1 drop of concentrated sulfuric acid was added to this suspension. Heat was evolved, and a clear solution resulted which was left at room temperature for 16 hours. Addition of water gave 5.1 g. (84% yield) of colorless, crystalline, beta conidendrol diacetate melting at 175–178° C. The diacetate was recrystallized from hot ethanol, whereupon its melted at 179–180° C. and was characterized as follows:

$$\alpha_D^{20} + 14° \text{ (acetone, C=4)}$$

Analysis: $C_{26}H_{24}O_{10}$

Calculated: C, 62.9; H, 4.87
Found: C, 62.8; H, 4.94

*Example 2*

This example illustrates the application of other cyclic tertiary amines, i. e. the lutidines and picoline to the process of the present invention.

A mixture of 100 ml. commercial lutidine-picoline, containing equal parts of 2,4 lutidine and alpha picoline, and 150 ml. of 31% technical hydrochloric acid was boiled until the temperature reached 241° C. To this was added 105 g. of conidendrin. The mixture was heated at 210° C. for 45 minutes, poured into 2900 ml. of boiling water containing a little decolorizing charcoal, filtered hot and allowed to cool. On seeding, 72.7 g. of beta conidendrol crystallized out, corresponding to 75.4% of theory. The melting point was 245–247° C. The mixed melting point with the product from Example 1 showed no depression.

*Example 3*

This example illustrates the application of still another tertiary cyclic amine, quinoline, in the presently described process of beta conidendrol manufacture.

A mixture of 16 ml. of freshly distilled quinoline and 10 ml. of concentrated hydrochloric acid was boiled until the temperature reached 210° C. To this was added 10 g. of conidendrin and the clear melt heated at 190° C. for 2 hours. The melt was then poured into 200 ml. of hot water containing a little sodium bisulfite and decolorizing charcoal and filtered hot. The cooled filtrate was extracted continuously with ether for 4 hours, the ether separated and removed by evaporation, leaving 8.0 g. of oil and crystals. These were recrystallized from hot water giving 4.5 g. of crystalline beta conidendrol (49% yield), melting at 248–250° C. A mixed melting point with the preparation in Example 1 gave no depression.

*Example 4*

This example illustrates the application of a secondary amine (dimethyl amine) in the presently described process.

A mixture of 37 ml. of 23.6% aqueous dimethylamine and 25 ml. of concentrated hydrochloric acid were boiled until the temperature reached 200° C. 10 grams of conidendrin was then added and the clear melt heated at 235° C. for 10 minutes, then at 260° C. for 5 minutes. The melt was poured into 200 ml. of hot water containing a little sodium bisulfite and decolorizing charcoal and filtered hot. The filtrate was seeded and, on cooling, deposited 6 g. or 65% of theory of crude crystalline beta conidendrol. Recrystallization of this from hot water containing a little sodium bisulfite and decolorizing charcoal gave 3.3 g. of light tan-colored crystals corresponding to 36% of theory and melting at 248–250° C. A mixed melting point with the product from Example 1 showed no depression.

*Example 5*

This example illustrates the application of a primary amine (methyl amine) in the process of the present invention.

A mixture of 10 g. of methylamine hydrochloride and 4 g. of conidendrin was heated to give a clear melt. This melt was heated at 260–270° C. for 10 minutes and then poured into 200 ml. of hot water containing a little sodium bisulfite and decolorizing charcoal. After filtering hot, the filtrate was cooled and extracted with ether. The ether was separated and removed by evaporation giving 2 g. (54% of theory) of oil and crystals. This residue was recrystallized from hot water giving 0.7 g. or 19% of theory of white crystals, melting at 245–247° C. A mixed melting point with the beta conidendrol from Example 1 showed no depression.

Having thus described my invention in preferred embodiments, I claim:

1. Beta 1,2,3,4-tetrahydro-6,7-dihydroxy-4-(3',4'-dihydroxyphenyl) - 3 - (hydroxymethyl) - 2-naphthoic acid-gamma-lactone.

2. The process of making beta conidendrol (beta 1,2,3,4-tetrahydro - 6,7 - dihydroxy - 4-(3'4' - dihydroxyphenyl) - 3 - (hydroxymethyl) - 2-naphthoic acid-gamma-lactone), which comprises heating conidendrin (alpha 1,2,3,4-tetrahydro - 6 - hydroxy - 7 - methoxy - 4 - (3'methoxy - 4' - hydroxyphenyl) - 3 - (hydroxymethyl) - 2-naphthoic acid-gamma-lactone) with an amine salt until the conidendrin has been substantially converted to beta coindendrol.

3. The process of claim 2 wherein the amine salt comprises a tertiary amine salt.

4. The process of claim 2 wherein the amine salt comprises an amine hydrochloride.

5. The process of making beta conidendrol (beta 1,2,3,4-tetrahydro-6,7-dihydroxy-4-(3'4'-dihydroxyphenyl) - 3 - (hydroxymethyl) - 2-naphthoic acid-gamma-lactone), which comprises heating conidendrin (alpha 1,2,3,4-tetrahydro - 6 - hydroxy - 7 - methoxy - 4 - (3'methoxy - 4' - hydroxyphenyl) - 3 - (hydroxymethyl) - 2-naphthoic acid-gamma-lactone) with an amine salt in the relative proportions of at least 2 mols of amine salt for each mol of conidendrin at a temperature of above 15° C., but below the decomposition temperature of the conidendrin and of the amine salt, until the conidendrin has been substantially converted to beta conidendrol.

6. The process of claim 5 wherein the amine salt comprises an amine hydrochloride.

7. The process of claim 5 wherein the amine salt comprises a primary amine salt.

8. The process of claim 5 wherein the amine salt comprises a primary amine hydrochloride.

9. The process of claim 5 wherein the amine salt comprises methyl amine hydrochloride.

10. The process of claim 5 wherein the amine salt comprises a secondary amine salt.

11. The process of claim 5 wherein the amine salt comprises a secondary amine hydrochloride.

12. The process of claim 5 wherein the amine salt comprises dimethyl amine hydrochloride.

13. The process of claim 5 wherein the amine salt comprises a tertiary amine salt.

14. The process of claim 5 wherein the amine salt comprises a cyclic tertiary amine salt.

15. The process of claim 5 wherein the amine salt comprises a cyclic tertiary amine hydrochloride.

16. The process of claim 5 wherein the amine salt comprises a salt of pyridine.

17. The process of claim 5 wherein the amine salt comprises pyridine hydrochloride.

18. The process of claim 5 wherein the amine salt comprises a salt of quinoline.

19. The process of claim 5 wherein the amine salt comprises quinoline hydrochloride.

20. The process of claim 5 wherein the amine salt comprises a salt of an alkyl substituted pyridine.

21. The process of claim 5 wherein the amine salt comprises an alkyl substituted pyridine hydrochloride.

22. The process of claim 5 wherein the amine salt comprises a mixture of the hydrochlorides of alpha picoline and 2,4 lutidine.

References Cited in the file of this patent

Brauns, J. Org. Chem. 10, 216–18 (1945).
Fisher, J. Am. Oil Chem. Soc. 24, 340–3 (1947).
Erdtman et al., Acta Chem. Scand. (1949) 3, June 20, 1949, pp. 982–4.